United States Patent
Cicchitti (10) Patent No.: US 12,196,643 B2
(45) Date of Patent: Jan. 14, 2025

(54) METHOD AND A SYSTEM FOR DETECTING FEATURES OF A WATER LAYER BETWEEN ENCLOSURE LAYERS OF SINGLE UNIT DOSE PRODUCTS

(71) Applicant: Fameccanica.Data S.p.A., San Giovanni Teatino (IT)

(72) Inventor: Anselmo Cicchitti, San Giovanni Teatino (IT)

(73) Assignee: Fameccanica.Data S.p.A., San Giovanni Teatino Chieti (IT)

( * ) Notice: Subject to any disclaimer, the term of this patent is extended or adjusted under 35 U.S.C. 154(b) by 379 days.

(21) Appl. No.: 17/851,133

(22) Filed: Jun. 28, 2022

(65) Prior Publication Data
US 2023/0003603 A1    Jan. 5, 2023

(30) Foreign Application Priority Data
Jun. 30, 2021 (EP) .................................. 21182827.2

(51) Int. Cl.
  *G01M 3/22* (2006.01)
  *G01N 21/3581* (2014.01)
  *G01N 21/90* (2006.01)
  *G06T 7/00* (2017.01)

(52) U.S. Cl.
  CPC ........ *G01M 3/227* (2013.01); *G01N 21/3581* (2013.01); *G01N 21/9081* (2013.01); *G06T 7/0004* (2013.01); *G06T 2207/10048* (2013.01)

(58) Field of Classification Search
  None
  See application file for complete search history.

(56) References Cited

U.S. PATENT DOCUMENTS

| | | | | |
|---|---|---|---|---|
| 3,599,477 A | * | 8/1971 | Cohen | G01N 29/0609 73/606 |
| 9,869,604 B2 | | 1/2018 | Khalaf et al. | |
| 2009/0199877 A1 | | 8/2009 | Koch et al. | |
| 2013/0295012 A1 | * | 11/2013 | Ingber | A61P 21/00 424/9.1 |
| 2016/0116814 A1 | * | 4/2016 | Teranishi | G02F 1/172 359/296 |
| 2018/0057776 A1 | | 3/2018 | Sanz | |

FOREIGN PATENT DOCUMENTS

EP    1504994 A2    2/2005

OTHER PUBLICATIONS

European Search Report dated Dec. 13, 2021. 8 pages.

* cited by examiner

*Primary Examiner* — Darryl V Dottin
(74) *Attorney, Agent, or Firm* — RMCK Law Group PLC (57) ABSTRACT

A method and a system are disclosed for detecting features of a water layer in layered enclosures of single unit dose products. Thanks to the method and the system of the invention, the layered enclosures may be manufactured to higher specifications and quality owing to real time control of the features of the water layer between the enclosure layers. The technical advantage of the method of the invention consists in the possibility to detect the features after formation of the layered enclosure is complete—hence inspecting the finished product—and to feed back the detected information to the very water laying device for a real time adjustment of the features of the water layer at the areas where acceptance criteria are not met.

15 Claims, 5 Drawing Sheets

METHOD AND A SYSTEM FOR DETECTING FEATURES OF A WATER LAYER BETWEEN ENCLOSURE LAYERS OF SINGLE UNIT DOSE PRODUCTS

CROSS-REFERENCE TO RELATED APPLICATION

This application claims priority to European Patent Application No. 21182827.2 filed Jun. 30, 2021. The disclosure of the above application is incorporated herein by reference in its entirety.

FIELD OF THE INVENTION

The present invention refers to the manufacturing of the so-called single unit dose products, such as dishwasher detergent pouches or washing machine detergent pouches.

PRIOR ART

Figure 1:
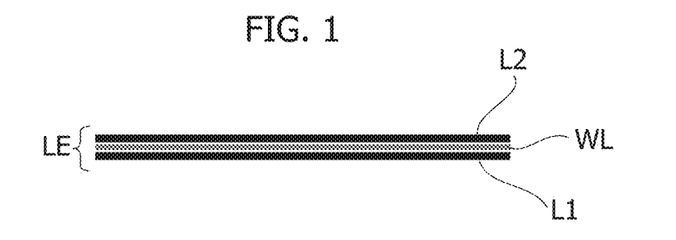
FIG. 1, already described, is a schematic representation of the general layered structure of single unit dose products FIGS. 2 to 4, already described, are representative of technical solutions for applying a water layer onto a web material involved with the manufacturing of the single unit dose products.

With reference to FIG. 1, single unit dose products, and in general single unit packaging items, are generally manufactured by providing a first layer L1 of a water soluble web material (typically PVA), a second layer of water soluble web material (typically PVA) L2 bonded to the layer L1 by a water layer WL. The layer L1 (and/or the layer L2) is shaped into a plurality of sockets defining a reservoir for one or more products such as detergents (for instance by sucking the web material of the layer L1 on the socketed surface of a roller), wherein each reservoir is processed into an enclosure (or pouch) by sealing the second layer L2 onto the first layer at the areas surrounding the sockets, wherein sealing is achieved by means of the water layer WL and the interaction thereof with the materials of the layers L1, L2. Accordingly, a layered enclosure is defined for the products which comprises the layers L1, L2 with the water layer WL in between and the products confined within reservoirs or pouches formed in the layered enclosures and sealed off by means of water bonding between layers L1 and L2.

Formation of the water layer WL is one of the crucial and most critical features of manufacturing of single unit dose products. The thickness, as well as the uniformity thereof, are susceptible of altering the features of the final products. For instance, the water layer WL may be insufficient to provide bonding of the layers L1 and L2 with the required strength to prevent leaking of the products inside the pouch. When the pouch comprises multiple compartments, each compartment must be sealed off to prevent undesired mixing of different product in other compartments: as per the above, a non-uniform water layer thickness may result in insufficient bonding with breaking of the seal between adjacent compartments and mixing of the products within the pouch.

Laying of the water layer WL is typically done by

Figure 2:
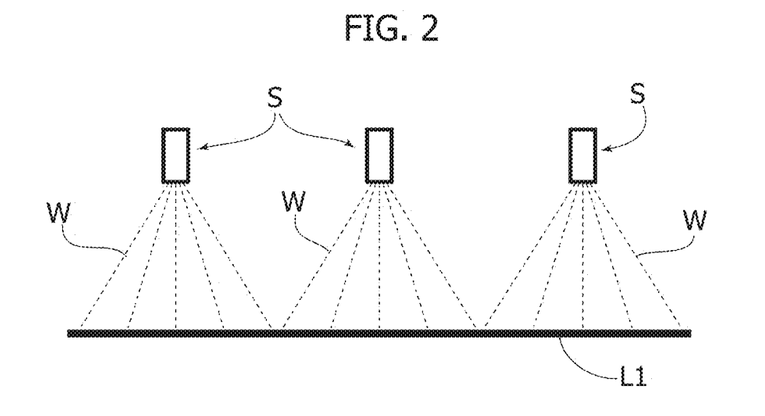
Figure 3:
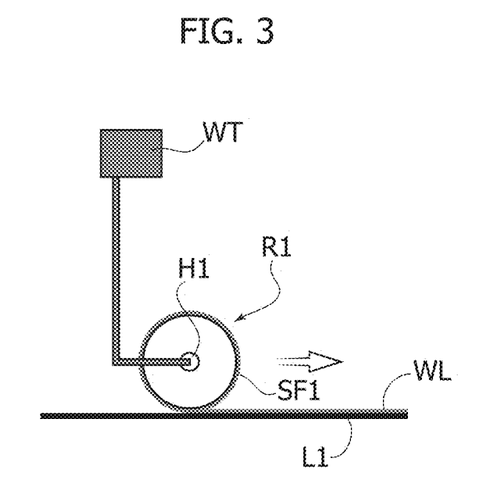
Figure 4:
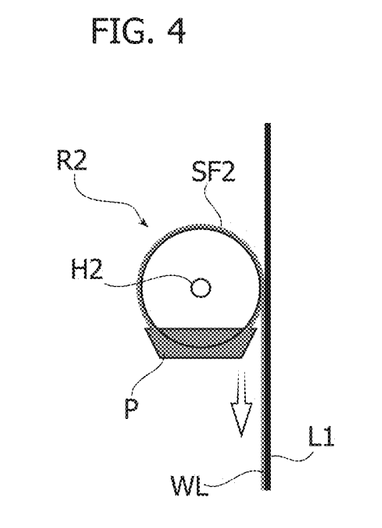

FIG. 2: spraying the surface of the layer L1 which is intended to face the surface of the layer L2, i.e. the surface(s) which the products inside the pouch come into contact with, with water dispensed by one or more sprinklers or sprayers S;

FIG. 3: water application through a soaking roller R1 which drains water from a reservoir WT in fluid communication with a distributor hub H1 of the roller R1, whereby the soaking roller attracts water from the hub through deformation—as a sponge would do;

FIG. 4: water application through a soaking roller R2 which drains water directly from a water pan WP. The roller R2 is rotatable around a hub H2 which in this case does not administer any fluid.

Whatever the solution, the skilled person will readily appreciate that controlling the uniformity and thickness of the water layer is inherently difficult, especially in the absence of a feedback loop that allows corrections of the operating parameters of the water laying system (whether a roller or a sprinkler/sprayer). It may rightly be said that laying of the water layer WL may turn out to be a real weak link in the manufacturing chain of single unit dose packaged products.

OBJECT OF THE INVENTION

The object of the present invention is to overcome the above mentioned technical problems. In particular, the object of the invention is to provide a reliable method to detect uniformity of a water layer in the manufacturing of single unit dose products. A further object of the invention is to provide a system for laying a water layer which can be operated based on a feedback from the above method.

SUMMARY OF THE INVENTION

The object of the invention is achieved by a method, a machine and a water laying roller having the features of the claims that follow, which form an integral part of the technical disclosure provided herein in relation to the invention.

BRIEF DESCRIPTION OF THE FIGURES

The invention will now be described with reference to the attached figures, provided purely by way of non-limiting examples, wherein:

FIGS. 6, 6A are representative of an aspect of a method of detecting features of a water layer of the invention, FIGS. 7A and 7B schematically show different operating conditions in a second aspect of the method according to the invention, FIG. 11 is a general operational flow chart of the system of FIG. 10.

DETAILED DESCRIPTION

Figure 5:
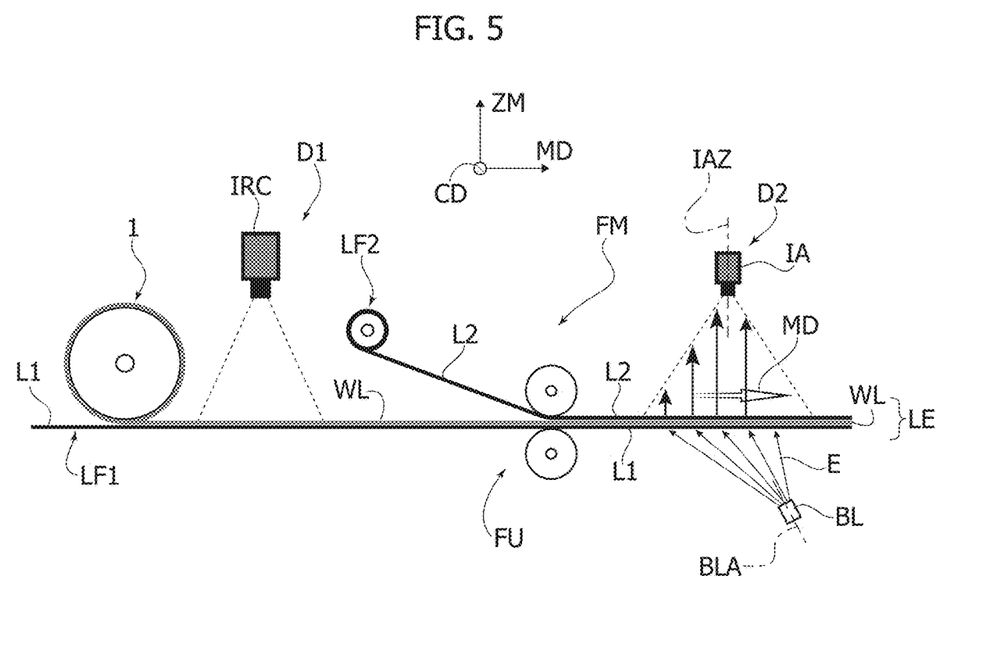
FIG. 5 shows a general arrangement of a machine according to the invention.
Figures 6, 7A, 7B:
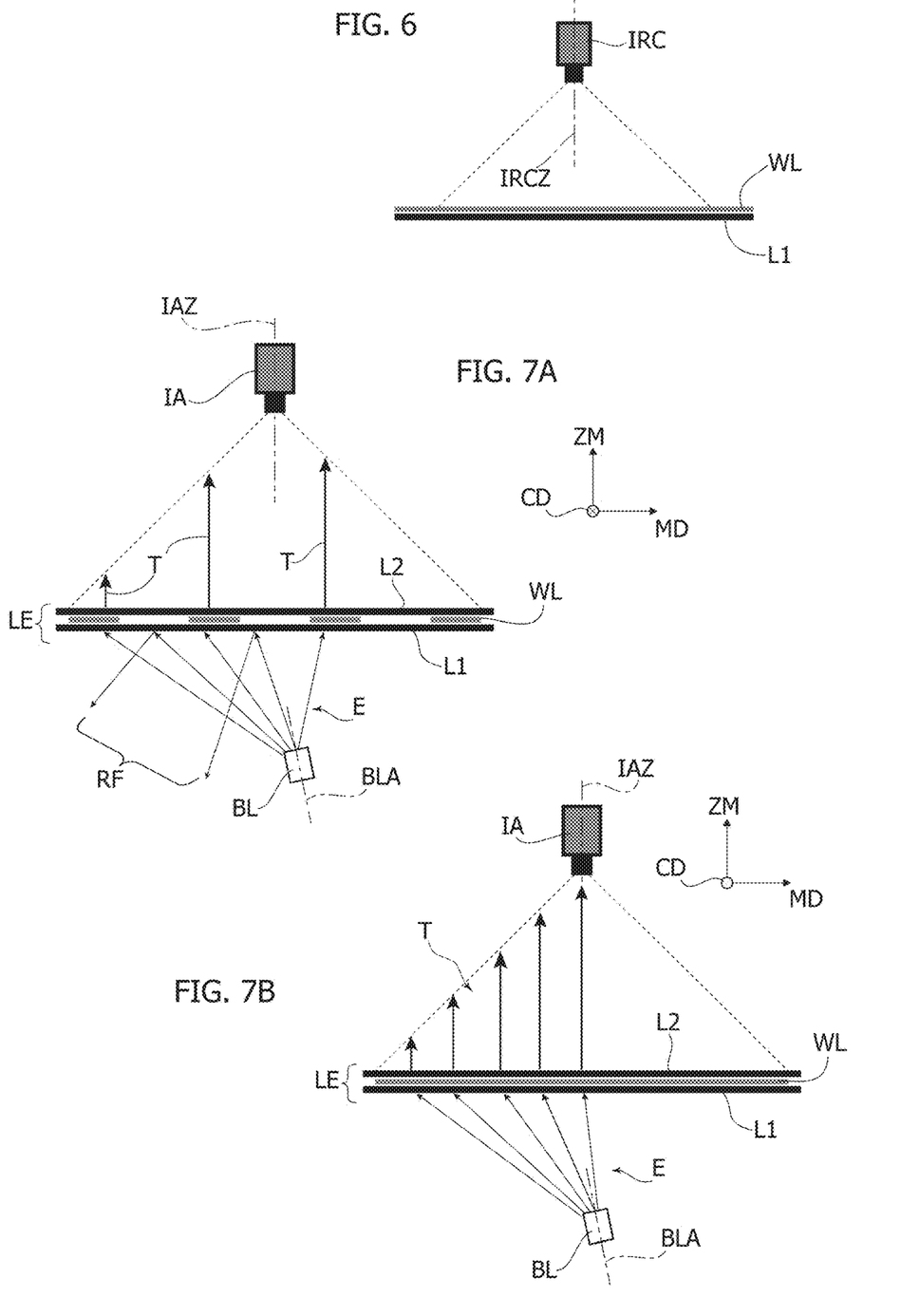

With reference to FIGS. 5 to 7, various embodiments of the invention refer to a method for detecting features of a water layer WL provided for bonding a first layer L1 and a second layer L2 of a layered enclosure of a single unit dose product. The method generally comprises:

acquiring an image of the water layer WL
obtaining an intensity-based image of the water layer WL, mapping the intensity-based image according to an intensity indicator, and defining one or more thresholds for the intensity indicator, and comparing the intensity indicator at selected areas of the intensity-based image with the one or more thresholds to detect said features.

The features of the water layer WL that can be detected through the method of the invention comprise one or more of: water amount in the water layer, water layer density, water layer temperature, water layer thickness.

In the present disclosure, reference to a "layered enclosure" (LE) is intended to designate the layered arrangement of water soluble enclosure layers L1 and L2, each made of a water soluble web material (e.g. PVA), which define multiple reservoir enclosures (or pouches, reference SUD, see FIG. 9) for single unit dose products through forming of at least one of the layers L1, L2 into the very enclosures and by water bonding of the layers L1, L2 through the interposed water layer WL. The arrangement of the enclosures SUD across the web material of the layers L1, L2 is typically matrix-wise, the arrangement being designated by reference M in FIG. 9. The layered enclosure LE is to be intended as a moving web which is fed through a forming machine (and on to further processing stages) in a feeding direction commonly designated as a machine direction MD. The machine direction MD also allows identification of a transverse direction—commonly known as cross direction CD—which like the machine direction belongs to the web of the layered enclosure, and a third direction ZM which is an off-web direction orthogonal both to the machine direction MD and to the cross direction CD.

To this end, FIG. 5 shows a general arrangement of a layered enclosure forming machine FM supplemented with features of the present invention.

The machine FM comprises:
 a first layer feeding unit LF1 configured for feeding the first layer L1 in the machine direction MD,
 a second layer feeding unit LF2 configured for feeding the second layer in the machine direction MD,
 a water laying device 1 configured for providing the water layer WL onto the first layer L1, the water laying device 1 comprising an adjustable water delivery,
 a layered enclosure forming unit FU configured for deforming one of the first layer L1 and the second layer L2 (preferably the first layer L1) into a plurality of reservoirs, filling each reservoir with a product, and applying the second layer L2 onto the first layer L1 to achieve bonding thereof through the water layer WL set therebetween.

According to the invention, the machine FM further comprises at least one of:
 a first water layer diagnostic unit D1 arranged upstream of the layered enclosure forming unit FU in the machine direction MD, and configured for imaging the water layer WL onto the first layer L1 prior to application of the second layer L2 thereon, obtaining an intensity-based image of the water layer WL, and mapping the intensity-based image according to an intensity indicator,
 a second water layer diagnostic unit D2 arranged downstream of the layered enclosure forming unit FU in the machine direction MD and configured for imaging the water layer WL in the layered enclosure LE following formation thereof, obtaining an intensity-based image of the water layer (WL), and mapping the intensity-based image according to an intensity indicator.

Throughout the disclosure, the intensity indicator is generally intended to designate a parameter or a quantity representative of light intensity (such as power per unit area) at pixels of the image, the pixels being generally processed in aggregation based on the selected area.

According to an advantageous aspect of the invention, which will be detailed in the following, the adjustable water delivery of the water laying device 1 is operable as a function of the intensity indicator from the first water layer diagnostic unit and/or the second water layer diagnostic unit.

In one aspect of the method and the machine of the invention, the first water layer diagnostic unit D1 comprises an infrared camera IRC (also known as thermal camera). The infrared camera IRC is configured to image the water layer WL laid onto the layer L1 prior to the application of the layer L2 onto the same, i.e. prior to the formation of the layered enclosure LE. The infrared camera IRC may be installed so to have an optical axis IRCZ orthogonal to a plane of the water layer WL, or lying at an angle with respect to a direction orthogonal to the plane itself, so to maximise the area of the water layer WL.

The image of the water layer WL acquired by the camera IRC is an infrared image, which is rendered into an intensity based-image (e.g. a false color image based on the intensity of infrared emission at each pixel of the image) in the visible spectrum.

Figure 6A:
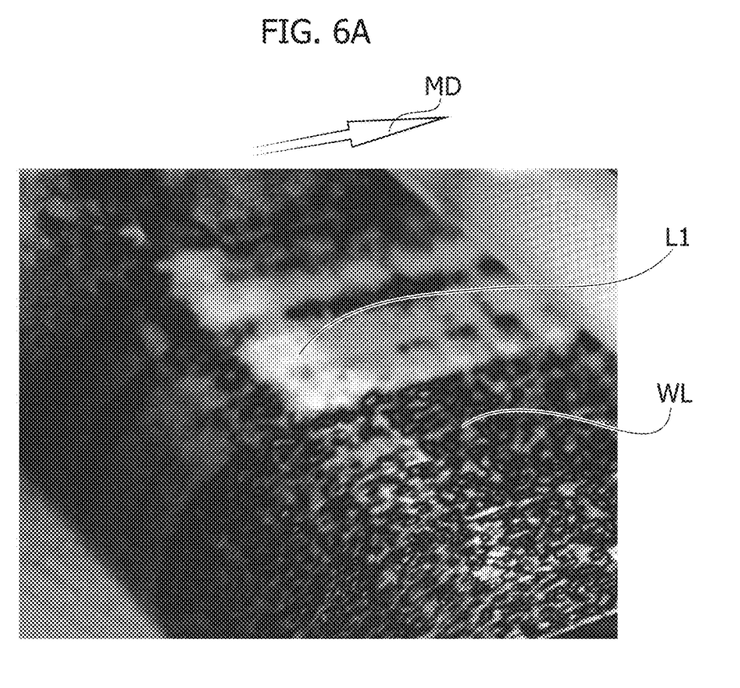

An example of the rendered image is shown in FIG. 6A, where the brighter areas correspond to the layer L1, and the darker areas correspond to the water layer WL. this means that the infrared camera IRC is positioned so as to face the water layer WL directly, as the interposition of the layer L1 would otherwise alter the infrared emission of the water layer WL captured by the camera IRC. Another example of a rendered intensity based image is a greyscale image including a plurality of pixel each coded into a byte image, whereby the preferred intensity indicator is the conventional 8-bit integer byte image of the pixel featuring values ranging from 0 (black/totally dark) to 255 (white/totally bright), for a total of 256 shades of grey. Generation of the intensity-based image may be obtained via the electronics onboard the camera IRC or via a separate control unit operatively connected to the camera IRC and part of the diagnostic unit D1

The rendered image generated on the basis of the image of the water layer may be conveniently processed through a vision algorithm to implement specific area patterns to test the features of the water layer WL against the selected intensity threshold(s), for instance intensity threshold based on the intensity values at the pixels of the rendered image. When the diagnostic unit D1 comprises the infrared camera IRC, the temperature of the water layer WL is inherently embedded in the intensity of the pixel of the rendered image. Other features of the water layer WL mentioned above may be detected through image analysis techniques, per se known in the field.

With reference to FIGS. 7A, 7B, in another aspect of the method and the machine of the invention, the second water layer diagnostic unit D2 involves the use of a different imaging system from the unit D1, as well as the diagnosis of the water layer at a different stages in the manufacturing of the layered enclosure LE.

FIGS. 7A and 7B are representative of a preferred embodiment of the second water layer diagnostic unit D2. The embodiment in FIGS. 7A and 7B may essentially be regarded as a diagnostic system for the water layer WL which is based on the optical phenomena illustrated in the same figures.

Reference IA designates an image acquisition device—for instance a camera with a CCD or CMOS sensor—which is arranged on one side of the layered enclosure, for instance facing the layer L2 and located on the same side of the layer WL as the layer L2, the image acquisition device IA comprises a linear scan camera (2048 pixels 40 KHz), FOV 12 mm optics installed at 500 mm to return a 40 mm FOV.

Reference BL designates a lighting (more specifically a back lighting) device which is arranged on an opposite side of the layered enclosure LE with respect to the image acquisition device IA, for instance facing the layer L1 and accordingly located on the same side of the layer WL as the layer L1, hence on an opposite side of the layer L2 (note, however that the arrangement of the image acquisition device IA and the backlighting device BL may be reversed depending on the needs).

Preferably, while the image acquisition device IA is arranged so as to have an optical axis IAZ orthogonal to the surface of the layered enclosure LE, the lighting/backlighting device BL is arranged so to have an optical axis BLA lying at an angle with respect to a direction orthogonal to a plane of the water layer, preferably lying at an angle of 3°+/−1° with respect to such an orthogonal direction, so to maximise the area of the water layer impinged by the emission E and maximise the detection area for the image acquisition device IA. In some embodiments, the image acquisition device IA may be arranged so as to have an optical axis IAZ lying at an angle with respect to a direction orthogonal to a plane of the water layer.

The lighting/backlighting device BL is configured to provide a light emission E which impinges upon the layered enclosure LE—in this arrangement starting from the layer L2. As with any electromagnetic radiation, interaction of the light emission E with a medium such as the layered enclosure results in the same radiation being refracted and/or reflected. With a layered enclosure featuring layers L1, L2 with a water layer WL in between, the interaction unfolds essentially as shown in FIGS. 7A, 7B: with a discontinuous or non-uniform water layer WL (e.g. with thickness variations across the interface with the layers L1 L2) such as in FIG. 7A, the light emission E is refracted at the areas where the water layer WL is thicker or in any case more uniform and reflected at the areas where the layer WL includes little or no water.

Conversely, with a uniform layer WL, or in general with a layer WL that is sufficiently thick across the interface with the layers L1, L2, essentially all of the light emission E is refracted through the layered enclosure (FIG. 7B). Accordingly, the image acquired by the device IA will exhibit differently bright areas on account of the above behaviour, i.e. on account of the different intensity over the area of the layered enclosure owing to the features (thickness and distribution) of the layer WL. In general, features of the water layer WL mentioned above may be detected through image analysis techniques, per se known in the field.

Figure 8:
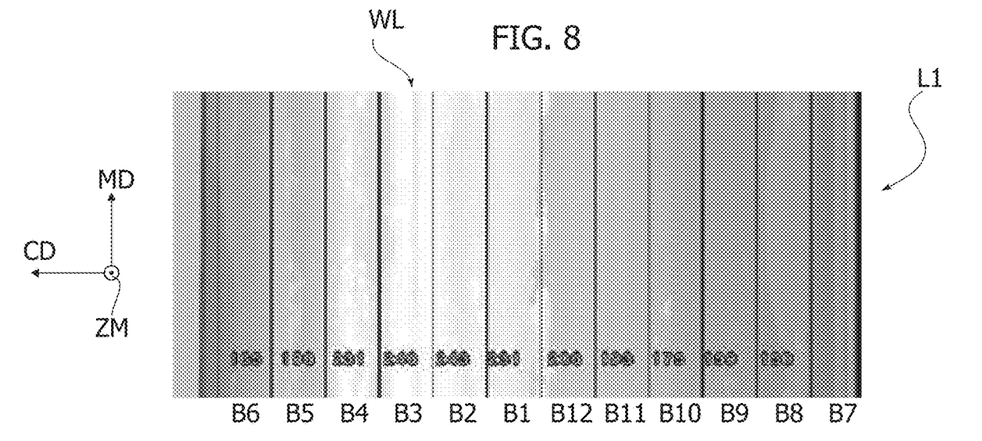
FIG. 8 is representative of a data output of the method of the invention.

As shown in FIG. 8, the intensity-based image is preferably a greyscale image including a plurality of pixel each coded into a byte image, whereby the preferred intensity indicator is the conventional 8-bit integer byte image of the pixel featuring values ranging from 0 (black/totally dark) to 255 (white/totally bright), for a total of 256 shades of grey. Generation of the intensity-based image may be obtained via the electronics onboard the image acquisition device IA or via a separate control unit operatively connected to the image acquisition device IA.

Again, a preferred intensity-based image generated on the basis of the image of the layered enclosure acquired by the device IA through the interaction of the light emission E from the lighting device BL across the layered enclosure LE is a grayscale image as per the above.

The grayscale image (or the general intensity-based image) may be conveniently processed through a vision algorithm to implement specific area patterns to test the features of the water layer WL against the selected intensity threshold(s), for instance intensity threshold based on the intensity values at the pixels of the rendered image.

mapping the intensity-based image of the layered enclosure LE according to a intensity indicator, and defining one or more thresholds for the intensity indicator, and comparing the intensity indicator at selected areas of the intensity-based image of the layered enclosure LE with the one or more thresholds.

In preferred embodiments, the method is carried out on the machine FM, with layers L1 and L2 moving in the machine direction MD, whereby the features of the water layer WL can be checked continuously before the layered enclosure is formed (diagnostic unit D1) and after the layered enclosure is formed (diagnostic unit D2). In even more preferred embodiment, diagnostic data are fed back to the water laying device 1 to correct and optimize the features of the water layer WL where necessary.

To the extent each of the diagnostic unit is present (i.e. whether only one of them, or both, are present), mapping the intensity-based image according to an intensity indicator, defining one or more thresholds for the intensity indicator, and comparing the intensity indicator at selected areas of the intensity-based image with the one or more thresholds may be performed by the units D1 and/or D2 themselves—for instance by the processing electronics onboard the camera IRC and the image acquisition device IA—or by an external processing unit operatively connected to the unit(s) D1 and/or D2.

Figure 9:
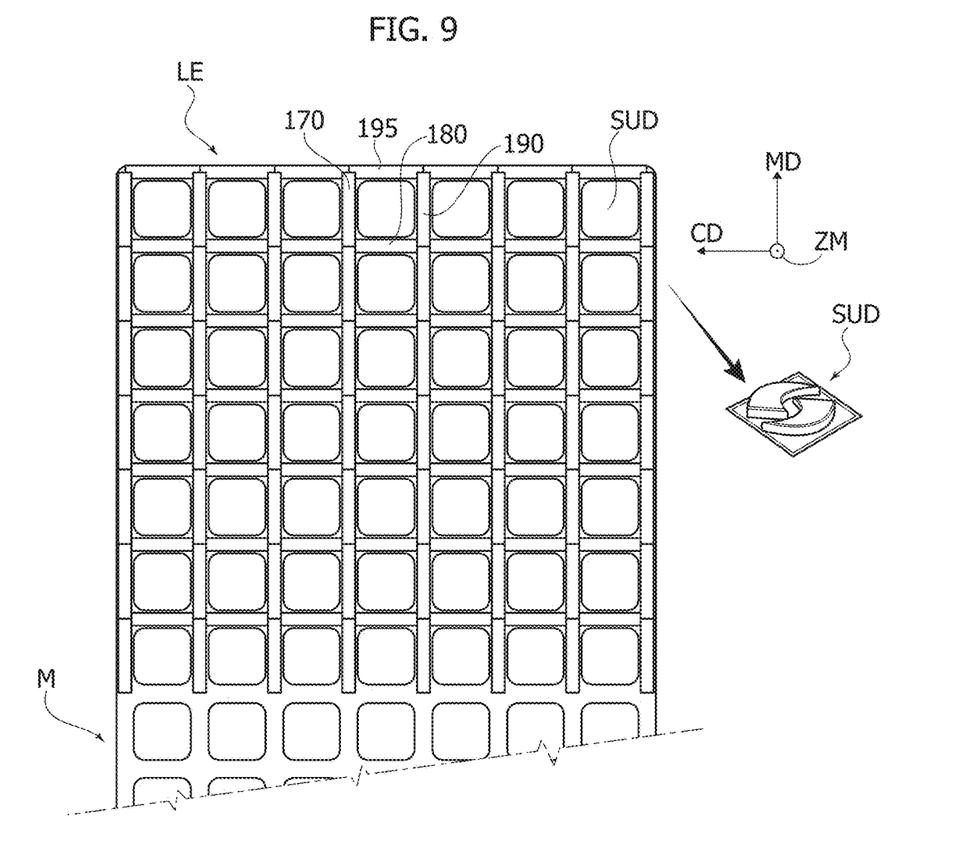
FIG. 9 is representative of a further data output of the method of the invention, FIG. 10 schematically shows a water laying system according to the invention.

As to the selected area, reference shall be made to FIGS. 8, 9 for exemplary purposes.

FIG. 8 is exemplary of a band-wise area pattern including a plurality—twelve in this case—of band wise areas B1, B2, B3, B4, B5, B6, B7, B8, B9, B10, B11, B12 extending along the machine direction MD and spanning the layer L1 along the cross direction CD. In other words, the layer L1 is discretized in the cross direction CD. This area pattern may be exemplary of an output of the diagnostic unit D1, whereby the rendered image therein shows the distribution of the water layer before the layered enclosures are formed.

FIG. 9 is exemplary of another area pattern comprising areas at which the intensity information, which is mapped through the intensity indicator, is tested against the selected threshold(s). In this embodiment the selected areas in the pattern comprise portions of the layered enclosure LE surrounding the reservoir enclosures/pouches SUD, i.e the areas are selected to coincide with the inter-reservoir portions which following cutting of the enclosures/pouches SUD into actual single units become a sealed perimeter of the enclosure/pouch itself, that is a critical area by definition as it bonds the layers L1, L2 following the formation of the layered enclosure LE. The area pattern in FIG. 9 is determined by a vision algorithm that discretizes the portions surrounding each reservoir enclosure/pouch SUD into rectangular shaped areas, each associated to a number (in the example herein: 170, 195, 180, 190) which represent the intensity information at the pixels in the area based on the byte images thereof (range 0-255). This area pattern may be exemplary of an output of the diagnostic unit D2, whereby the rendered image therein shows the distribution of the water layer around the reservoir enclosures after the layered enclosures is formed.

Whatever the area pattern that is selected, a lower threshold for the intensity information may be defined based on the minimum amount of water per unit area in the layer WL—or alternatively based on the minimum thickness of the water layer WL—that ensures stable bonding between the layers L1, L2.

An upper threshold may be defined based on the maximum amount of water per unit area in the layer WL—or alternatively based on the maximum thickness of the water layer WL—that may be tolerated by the layers L1, L2 prior to reaching solution thereof into the water layer WL itself, which would lead to a dissolution of the enclosure and leak or spill of the product therein.

According to the invention, the water layer feature information determined by the method disclosed above may either be used as a purely diagnostic information—for instance for quality control purposes—or may be used as a feedback information to modify the laying of the water layer WL to achieve improved uniformity thereof.

Figures 10, 11:
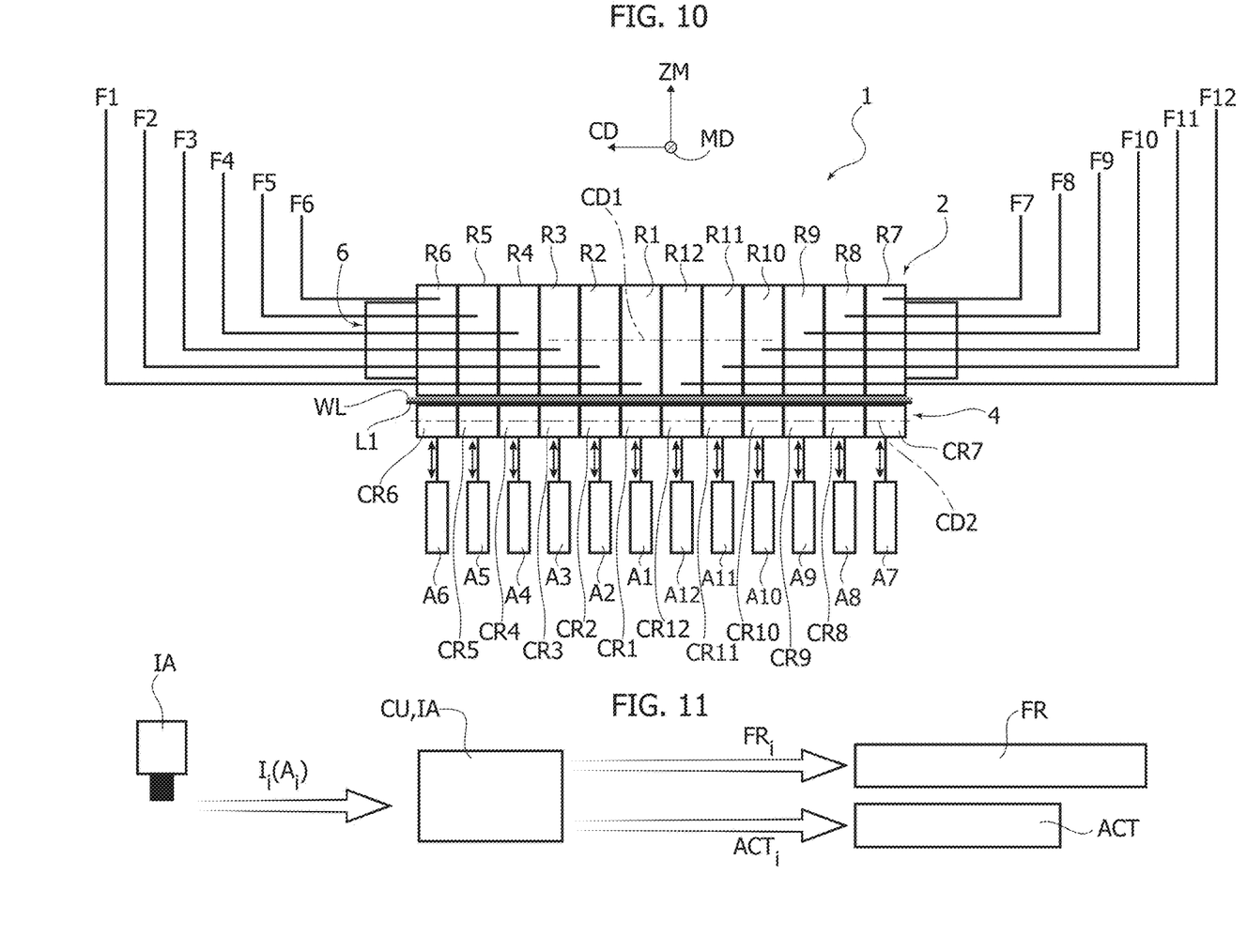

In this regard, the method may further comprise feeding back the value of the intensity indicator at the selected areas of the intensity based image to the water laying device 1 which operates upstream of the forming unit FU to vary water delivery thereof as a function of the intensity indicator values at the selected areas. FIG. 10 shows a preferred embodiment of such a water laying device 1.

Reference number 1 in FIG. 10 designates as a whole a water laying roller featuring a clustered roller arrangement 2. More specifically, the roller 1 is rotatable around an axis CD1 parallel to the cross direction and comprises a plurality of roller sections R1, R2, R3, R4, R5, R6, R7, R8, R9, R10, R11, R12, all coaxial to the axis CD1 and rotating synchronously (e.g. in one piece). The roller sections R1-R12 are clustered together into an overall single roller unit, whereby all of the roller sections have the same outer diameter. Each of the roller sections R1-R12 is provided as a soaking roller section, i.e. a roller section that can absorb and release water by soaking and squeezing, like a sponge. In preferred embodiments, the roller sections have a sponge like construction.

Additionally, the roller 1 also includes a clustered counter-roller arrangement 4 including a plurality of counter rollers CR1, CR2, CR3, CR4, Cry, CR6, CR7, CR8, CR9, CR10, CR11, CR12, each associated to a corresponding roller section R1-R12 (the association is to be intended as number based: counter roller CR12 is associated to roller R12 and so on).

Each of the counter rollers CR1-CR12 is made of a comparatively harder material than the roller sections R1-R12 and is rotatable around an axis CD2 parallel to the axis CD1 and is operatively connected to a respective actuator A1, A2, A3, A4, A5, A6, A7, A8, A9, A10, A11, A12 (again, the association is to be intended as number based: actuator A12 is associated to counter roller CR12 and so on) which is configured to displace the respective counter roller CR1-CR12 in a radial direction with respect to the axis CD1, or more in general in a direction that allows variation of the interference condition between the roller section and the respective counter roller (in this respect, even displacement having a non-purely radial direction will do, provided they result in an overall variation of the interaxis (distance CD1-CD2) between the roller section R1-R12 and the respective counter roller CR1-CR12.

Each of the roller sections R1-R12 is rotatably supported by a clustered hub 6 which features a plurality of hub section, preferably one for each roller section R1-R12. Each of the hub sections may be provided either as a separate hub section that interconnects with adjacent hub sections or as a portion of a unitary hub whereat the respective roller section R1-R12 is intended to be fitted—which is in fluid communication with a corresponding water supply line F1, F2, F3, F4, F5, F6, F7, F8, F9, F10, F11, F12 (the association is to be intended as number based: line F12 is associated to roller R12 and so on). The hub section-supply line communication is fully independent, whereby each hub section can be supplied with a water amount that is independent of the supply to other—even neighbouring—hub sections.

This means that roller sections R1-R12 are supplied with water from the inside out, i.e. from the hub 6 to the surface thereof. In this sense, displacement of the counter rollers CR1-CR12—hence variation of the interference condition between the roller section and the respective counter roller—results in a greater or lesser deformation of the respective roller section, which in turn results in an increased or decreased absorption of water from the hub 6. A greater roller section-counter roller interference in fact results in the roller section being more deformed, or—in other terms—in more voids being collapsed and compacted.

When the contact with the deformed portion of the roller section is released, the voids expand and attract water: the more they were collapsed upon interaction with the counter roller, the more will they expand back when deformation is lifted, thus attracting more water into and soaking the roller section. This, in addition to individual water supply of the hub sections, allows a precise control of the water released by each roller section when the same is brought into contact with the layer L1 during formation of the layered enclosure LE. FIG. 10 in this regard shows the routing of the layer L1 through the roller 1 and the laying of the water layer WL: it may be appreciated from FIG. 10 that the layer L1 is routed between the clustered roller arrangement 2 and the clustered counter roller arrangement 4, whereby the layer L1 moves between pairs of cooperating roller sections and counter rollers. In this regard, as the axis CD1 is parallel to the cross direction CD, the water laying roller 1 spans the layer L1 cross direction wise, whereby each of the roller section/counter roller pairs is configured to lay water on a respective band-wise portion of the layer L1. The arrangement of FIG. 8 is exemplary of this: each of the previously described bands B1-B12 (again, the association is to be intended as number based: line F12 is associated to roller R12 and so on) may correspond to a water laying domain for each roller section/counter roller pair, and as a selected area for comparing the intensity indicator values with the selected threshold(s).

In view of the above, adjusting water delivery of the water laying roller 1 based on the feedback—by the diagnostic unit D1 and/or the diagnostic unit D2—of the intensity indicator values at the selected areas (for instance, with reference to the roller 1, the bandwise areas B1-B12) comprises adjusting, at one or more of the corresponding roller sections R1-R12, hub sections, and counter rollers CR1-CR12, at least one of the interference condition between the roller section/counter roller pair, and the supply water flow through supply channels F1-F12.

This comprises operating each actuator A1-A12 and/or controlling the water supply through each of the supply lines F1-F12 to result in the laying of a water layer WL with modified features, for instance more uniform distribution, to meet a target intensity indicator value.

Such a target value may be, for instance, simply a value that falls within the lower and upper boundaries described in the foregoing (lower threshold-upper threshold). In other embodiments, the target value may be an actual single, punctual value that has to be met at a certain area of the layered enclosure LE. In any case, a closed loop control of water layer features during formation of the layered enclosure is achieved: the water layer feature diagnosed by the method and the system according to the invention are fed back into the same system to meet predetermined design requirement.

The units D1 and D2 provide inherently different feedback information. To the extent present, the unit D1 provides a feedback information preliminary to the forming of the layered enclosure LE, which allows correction of the water delivery to the layer L1 across separate bands B1-B12 in the cross direction CD, wherein delivery into each band may be adjusted independently of the others and only if needed. In this way, the risk of over- or under-correction is avoided.

The unit D2 instead provides a feedback information that allows correction of the features of the water layer as it results after the bonding of the layers L1, L2 together.

In either case, threshold values of the intensity indicator that trigger corrections may be selected based on experimental tests and calibration.

Note also that the water laying roller 1 is merely one of the possible embodiments of the system of the invention. In other embodiments, the roller 1 may be replaced by an array of individually controlled water sprayers or sprinklers that are controlled based on the intensity indicator information (values) retrieved from the layered enclosure LE: as per the above, the information is fed back to a control unit which governs operation of the sprayers or sprinklers, and the operation is individually adjusted based to meet a target value of the intensity indicator at the relevant, selected areas.

More in general, with reference to FIG. 11, the method may further comprise feeding back the intensity indicator $I_i(A_i)$ at selected areas $A_i$ of the intensity-based image of the layered enclosure LE or the layer L1 to a water laying device configured for providing the water layer WL, for instance to a control unit operatively associated to the water laying device, and adjusting water delivery of the water laying device to meet a target value of the intensity indicator at said selected areas, wherein adjusting water delivery of the water laying device comprises operating at least one actuator ACT (control signals $ACT_i$) or water flow control device FR associated to the water laying device (control signals $FR_i$). In the case of the roller 1, the at least one actuator is selected from among the actuators A1-A12, and the at least one water flow control device is selected from among the water supply lines F1-F12. In the case of water laying device comprising sprayers or sprinklers the actuators may comprise actuators configured for varying the position of the sprayers with respect to the layer L1 and the flow control devices may comprise flow control valves on the hydraulic lines that supply water to the sprinklers or the sprayers.

Thanks to the method and the machine of the invention, layered enclosure LE may be manufactured to higher specifications and quality owing to the real time control of the features of the water layer WL between the enclosure layers L1, L2 and even upstream of formation thereof into the layered enclosure, and the feedback of the information to the very water laying device for a real time adjustment of the features of the water layer at the areas where acceptance criteria (for instance the threshold disclosed herein) are not met.

Naturally, while the principle of the invention remains the same, the details of construction and the embodiments may widely vary with respect to what has been described and illustrated purely by way of example, without departing from the scope of the present invention.

The invention claimed is:

1. A method for detecting features of a water layer provided for bonding a first layer and a second layer of a layered enclosure of a single unit dose product, the method comprising:
   acquiring an image of the water layer,
   obtaining an intensity-based image of the water layer,
   mapping the intensity-based image according to an intensity indicator, and defining one or more thresholds for said intensity indicator, and
   comparing the intensity indicator at one or more selected areas of the intensity-based image with said one or more thresholds to detect said features of the water layer.

2. The method of claim 1, comprising:
   feeding the first layer in a machine direction,
   applying the water layer onto the first layer,
   feeding the second layer in the machine direction,
   forming one of the first layer and the second layer into reservoir enclosures, and
   bonding the second layer to the first layer through the water layer therebetween.

3. The method of claim 2, wherein said acquiring the image of the water layer comprises acquiring the image of the water layer applied onto the first layer of the layered enclosure prior to the application of the second layer of the layered enclosure.

4. The method of claim 3, wherein said image of the water layer is an infrared image, and wherein said intensity-based image is a rendered image in a visible spectrum.

5. The method of claim 2, wherein said acquiring the image of the water layer comprises acquiring the image of the water layer laid between and bonding the first layer and the second layer of said layered enclosure.

6. The method of claim 5, wherein said acquiring the image of the water layer comprises providing an image acquisition device, and a lighting device, wherein the image acquisition device and the lighting device are arranged so as to lie on opposite sides of the layered enclosure, and wherein said lighting device has an optical axis lying at an angle with respect to an orthogonal direction to a plane of the water layer.

7. The method of claim 1, wherein said layered enclosure comprises a matrix arrangement of reservoir enclosures for single unit dose products, and wherein said one or more selected areas comprise portions of the layered enclosure surrounding the reservoir enclosures.

8. The method of claim 1, wherein said one or more selected areas comprise band-wise areas extending along a feeding direction of the first layer and spanning the first layer along a direction transverse to the feeding direction.

9. The method of claim 1, further comprising:
   feeding back the intensity indicator at the one or more selected areas of the intensity-based image to a water laying device configured for providing said water layer, and
   adjusting water delivery of said water laying device to meet a target value of said intensity indicator at said one or more selected areas.

10. The method of claim 9, wherein said adjusting water delivery comprises independently adjusting water delivery of the water laying device at each of the one or more selected areas.

11. The method of claim 9, wherein said water laying device includes a water laying roller comprising:
- a clustered roller arrangement comprising a plurality of roller sections rotatable around a first axis of rotation, each roller section being a soaking roller section,
- a clustered counter roller arrangement comprising a plurality of counter rollers each associated to a corresponding roller section and rotatable around a second axis of rotation parallel to the first axis of rotation,
- a clustered hub arrangement comprising a plurality of hub sections, each associated to a corresponding roller section, each of the hub section being hydraulically connected to a respective water supply line configured to deliver a supply water flow to the corresponding hub section, whereby each roller section is configured to draw water from the respective hub section,
- wherein each counter roller is operatively associated to a corresponding actuator configured to displace the corresponding counter roller to vary an interference condition with the corresponding roller section, and
- wherein said adjusting water delivery of said water laying device comprises adjusting, at one or more of the corresponding roller sections, hub sections, and counter rollers, at least one of said interference condition and said supply water flow.

12. The method of claim 1, wherein said features of the water layer comprise one or more of: water amount in the water layer, water layer density, water layer temperature, and water layer thickness.

13. A machine for forming a layered enclosure for single unit dose products, the layered enclosure comprising a first layer and a second layer bonded by a water layer set therebetween, the machine comprising:
- a first layer feeding unit configured for feeding the first layer in a machine direction,
- a second layer feeding unit configured for feeding the second layer in the machine direction,
- a water layer laying device configured for providing the water layer onto said first layer, the water laying device comprising an adjustable water delivery,
- a layered enclosure forming unit configured for: forming one of the first layer and the second layer into a plurality of reservoirs, filling each reservoir with a product, and applying the second layer onto the first layer to achieve bonding thereof through the water layer set therebetween, the machine further comprising at least one of:
- a first water layer diagnostic unit arranged upstream of the layered enclosure forming unit and configured for: imaging the water layer onto the first layer prior to application of the second layer thereon, obtaining an intensity-based image of the water layer, and mapping the intensity-based image according to an intensity indicator, and
- a second water layer diagnostic unit arranged downstream of the layered enclosure forming unit and configured for imaging the water layer in the layered enclosure following formation thereof, obtaining an intensity-based image of the water layer, and mapping the intensity-based image according to an intensity indicator, wherein the adjustable water delivery is operable as a function of the intensity indicator from the first water layer diagnostic unit and/or the second water layer diagnostic unit.

14. The machine of claim 13, wherein, to the extent present,
- the first water layer diagnostic unit comprises an infrared camera arranged so as to face the water layer onto said first layer,
- the second water layer diagnostic unit comprises:
  - an image acquisition device (IA), preferably a linear scan camera, and
  - a lighting device,
- wherein the image acquisition device and the lighting device are arranged so as to lie on opposite sides of the layered enclosure, and
- wherein the image acquisition device is configured for acquiring an image of the layered enclosure resulting from an impingement of a light emission from said lighting device onto the layered enclosure.

15. The machine of claim 14, wherein said lighting device comprises an optical axis lying at an angle with respect to a direction orthogonal to a plane of the water layer.

* * * * *

UNITED STATES PATENT AND TRADEMARK OFFICE
CERTIFICATE OF CORRECTION

| | |
|---|---|
| PATENT NO. | : 12,196,643 B2 |
| APPLICATION NO. | : 17/851133 |
| DATED | : January 14, 2025 |
| INVENTOR(S) | : Anselmo Cicchitti |

It is certified that error appears in the above-identified patent and that said Letters Patent is hereby corrected as shown below:

On the Title Page

Item (71) Applicant address information should be listed as:
- Fameccanica.Data S.p.A., San Giovanni Teatino (Chieti), ITALY -

Item (72) Inventor address information should be listed as:
- Anselmo CICCHITTI, San Giovanni Teatino (Chieti), ITALY -

Signed and Sealed this
First Day of April, 2025

Coke Morgan Stewart
*Acting Director of the United States Patent and Trademark Office*